Oct. 10, 1939.  J. G. BERNEIKE  2,175,425
NUT CRACKING APPARATUS
Filed Oct. 12, 1937  3 Sheets-Sheet 1
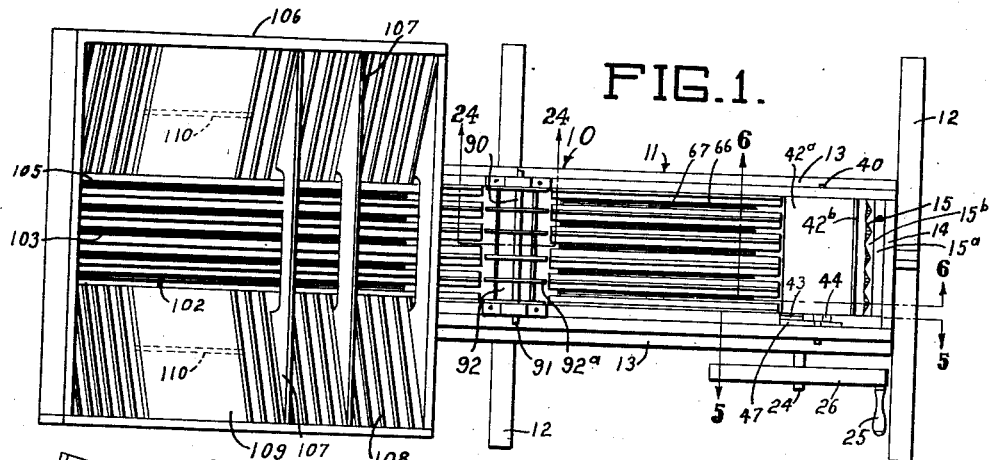
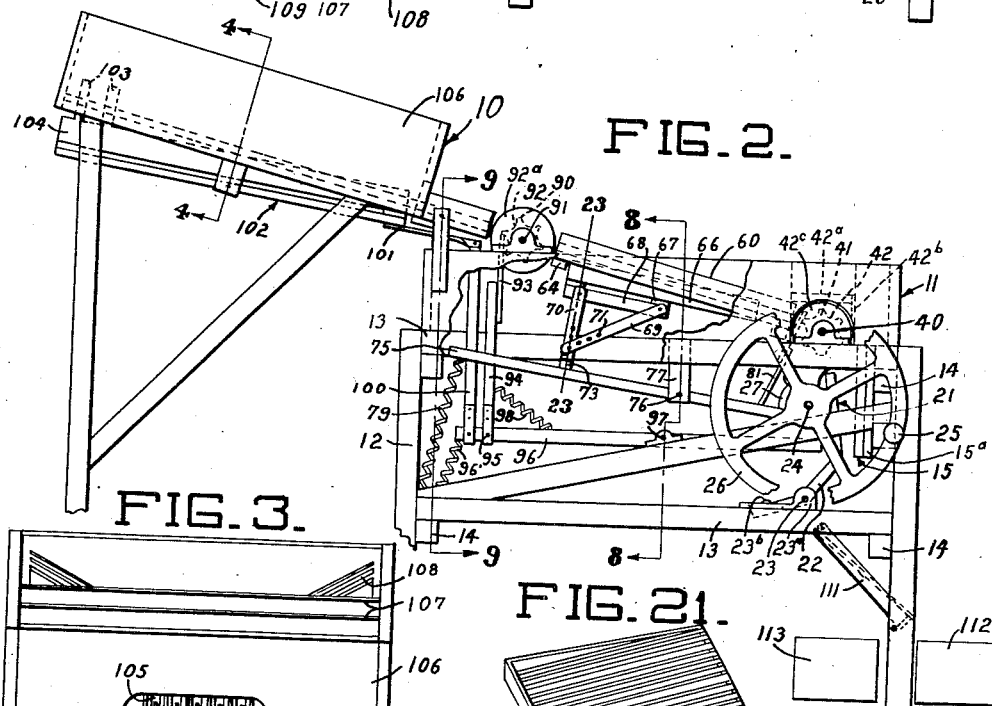
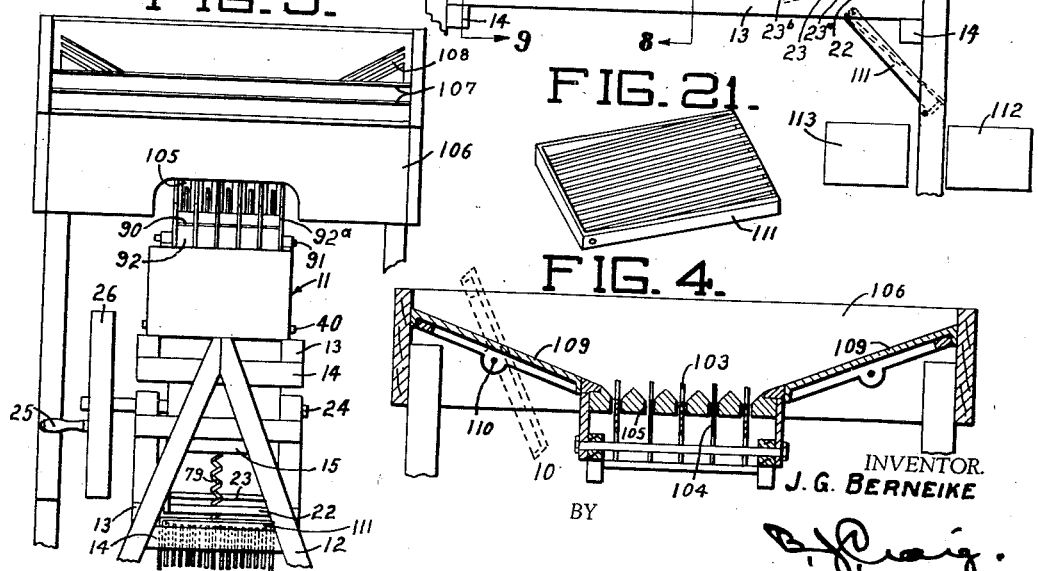
INVENTOR.
J. G. BERNEIKE
BY
ATTORNEY.

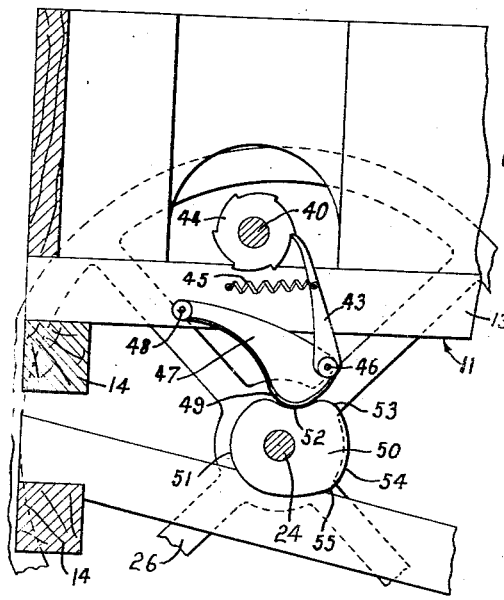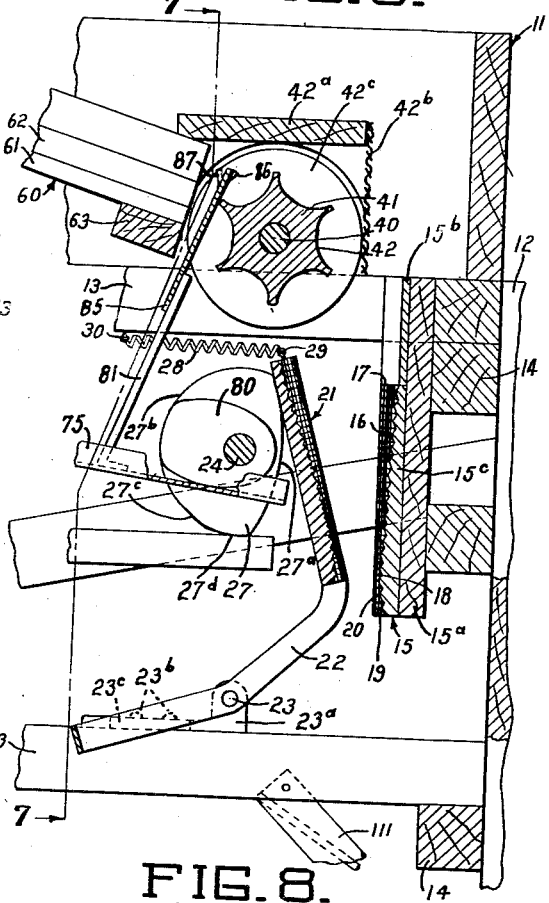

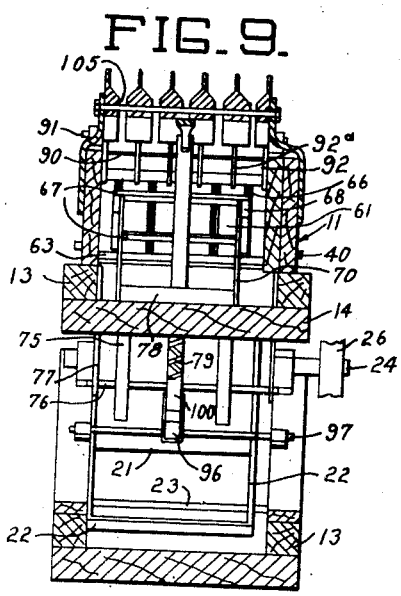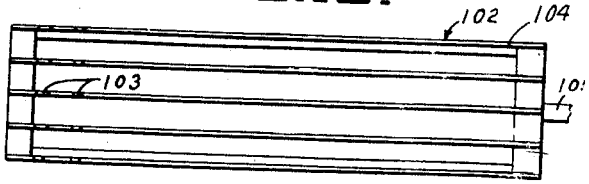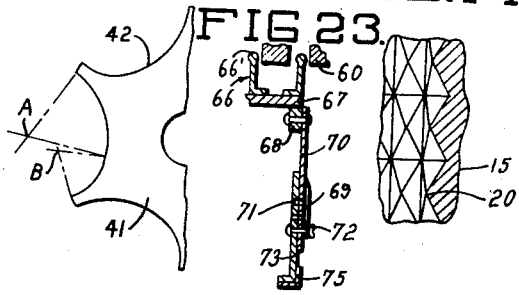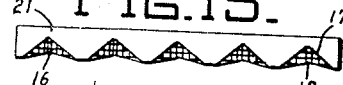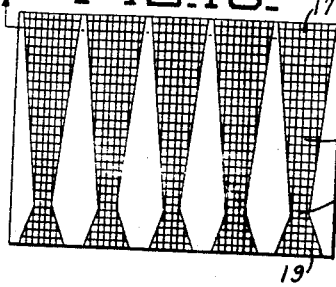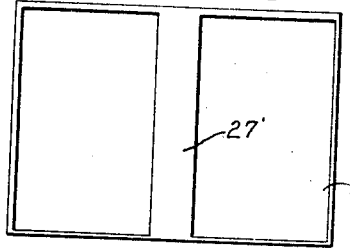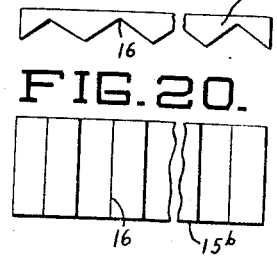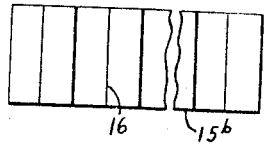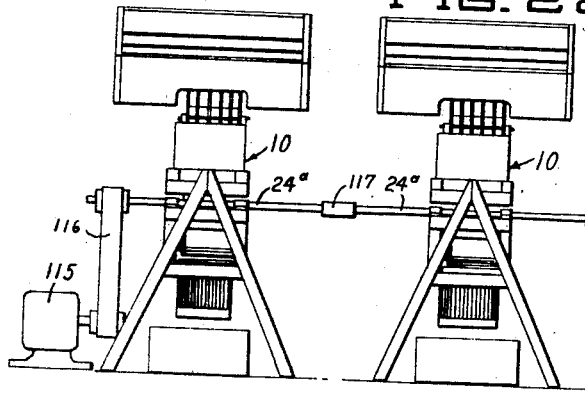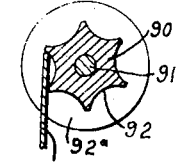

Patented Oct. 10, 1939

2,175,425

UNITED STATES PATENT OFFICE 2,175,425

NUT CRACKING APPARATUS

John G. Berneike, Anaheim, Calif.

Application October 12, 1937, Serial No. 168,637

6 Claims. (Cl. 146—12)

This invention relates to nut cracking machines.

The general object of the invention is to provide an improved apparatus for cracking the shells of nuts such as walnuts, hazel nuts and others which are of general spherical shape.

A more specific object of the invention is to provide an improved nut cracking machine including novel cracking members so constructed and operated as to break the shells and cause either the shells to fall free from the meat or to leave the shells so that they may be easily pulled from the meats without mashing the meats or disturbing the skin thereon.

Another object of the invention is to provide novel cracking jaws for use in a nut cracking machine.

A further object of the invention is to provide a novel means for feeding nuts to the cracking element of a cracking machine.

Other objects and the advantages of my invention will be apparent from the following description taken in connection with the accompanying drawings, wherein:

Fig. 1 is a top plan view of a nut cracking machine embodying the features of my invention;

Fig. 2 is a side elevation of the machine;

Fig. 3 is a front end view of the machine;

Fig. 4 is a section taken on line 4—4 Fig. 2;

Fig. 5 is a section taken on line 5—5 Fig. 1;

Fig. 6 is a section taken on line 6—6 Fig. 1;

Fig. 7 is a section taken on line 7—7 Fig. 6 on a reduced scale;

Fig. 8 is a section taken on line 8—8 Fig. 2 on a larger scale;

Fig. 9 is a section taken on line 9—9 Fig. 2 on a larger scale;

Fig. 10 is a top plan view of the lower agitator;

Fig. 11 is an end view of the lower agitator;

Fig. 12 is a top plan view of the upper agitator;

Fig. 13 is a fragmentary end view of the feed roll;

Fig. 14 is a fragmentary sectional detail of the cracking jaw;

Fig. 15 is a top plan view of the cracking jaw;

Fig. 16 is a front view of the cracking jaw;

Fig. 17 is a section taken on line 17—17 Fig. 16;

Fig. 18 is a rear view of the cracking plate;

Fig. 19 is a fragmentary top plan view of the upper part of the stationary cracking jaw;

Fig. 20 is a front elevation of the upper part of the stationary cracking jaw;

Fig. 21 is a perspective of the sifter;

Fig. 22 is a front elevation of a cracking apparatus embodying a plurality of units operated by an electric motor;

Fig. 23 is a section on line 23—23 Fig. 2; and

Fig. 24 is a section on line 24—24 Fig. 1.

Referring to the drawings by reference characters I have shown my invention as embodied in a nut cracking machine which is indicated generally at 10. As shown the apparatus includes a frame 11 which includes legs 12, upper and lower longitudinally extending side members 13 and upper and lower and intermediate transversely extending end members 14.

As shown the apparatus includes a fixed cracking plate or jaw 15 which is secured to a plate 15a mounted on certain of the transverse members 14. This fixed member plate 15 includes an upper part 15b and a lower part 15c. The upper and lower parts 15b and 15c have aligned grooves 16 therein. As shown the grooves 16 in the upper part are uniform while the grooves in the lower part decrease in width from the top 17 to an intermediate portion 18 whence they flare in width as at 19. The portion defining the groove in the lower part 15c is preferably provided with more or less regularly arranged pyramidal projections 20. The grooves 16 not only decrease in width downwardly but also decrease in depth towards the intermediate portion whence they increase in both width and depth towards the lower end.

The movable cracking member is indicated at 21 and is mounted on the upper end of a lever 22 which is pivoted as at 23 on a plate 23a held in place by screws 23b which are arranged in slots 23c so that the plate 23a may be adjusted to vary the opening of the jaws and the construction is such that when the lever 22 is rocked the jaw 21 moves towards the jaw 15 until the two assume a cracking position.

A shaft 24 is mounted adjacent the movable jaw 21 and is adapted to be rotated in any suitable manner as for instance by means of a handle 25 on a fly wheel 26.

Mounted on the shaft 24 I show a cam member 27 which as shown contacts a rib 27′ on the movable body 21 and when the shaft 24 rotates the cam 27 moves the movable jaw 21 towards the fixed jaw 15. A spring 28 has one end secured as at 29 to the movable jaw and the other end is secured as at 30 to the frame 11.

The cam 27 has a portion 27a which is so shaped that the movable jaw will assume the open position shown in Fig. 6 for an interval of time whereupon rotation of the shaft will cause the portion 27b of the cam to move the movable jaw towards the fixed jaw after a nut has been deposited between the jaws as will be hereinafter described. After the jaw has assumed the partially closed position the portion 27c on the cam engages the jaw 21 thus allowing the spring 28 to move the movable jaw slightly away from the fixed jaw and thus allow the nut to drop a very short distance whereupon further rotation of the cam causes the portion 27d thereon to complete the cracking action. Later the jaws open whereupon the cracked nut and shell and meats are dropped and another nut fed to position.

I lay particular emphasis on the fact that after the jaws are opened slightly and the nut has dropped and settled to position there is a slight opening of the jaws. This allows the nut to be firmly seated and causes the pyramidal protuberances to better engage the nut so that the nut is engaged at a number of points whereby when the crushing action takes place there is no upward movement of the nut and consequently the skin on the nut meat is not torn so that the keeping quality is unimpaired. With this arrangement the length of the cracking jaws can be made quite short so that efficiency in operation and saving of expense of manufacture is secured.

The pivot point 23, it will be noted, is disposed in the rear of the face of the removable plate and not in any plane of intersection of the axis of the jaws. This results in that the opening and closing of the plate gives a better cracking operation and provides a wide clearance after the nut is cracked.

Disposed above and slightly in the rear of the shaft 24 I show a shaft 40 on which a feed roller 41 rotates. This feed roller includes an elongated member having a plurality of longitudinally extending grooves 42 therein. In the drawings I show these grooves as six in number although this may be varied according to the working conditions. The grooves 42 form a compound curve with the leading portion of longer radius than that of the trailing portion as shown by the radii A and B in Fig. 13. This causes a better engagement of the nut. A cover member 42a is disposed over the feed roll and from this cover member a canvas flap 42b depends to prevent incorrect nut feeding. The feed roll has spaced disks 42c thereon to confine the advancing nuts to their proper grooves.

The feed roll is timed for intermittent motion to discharge a nut and this motion is secured by means of a pawl 43 which engages a ratchet 44 mounted to rotate with feed roll 41. The pawl is normally held against the ratchet 44 by a spring 45 and this pawl is pivoted on a shaft 46 which in turn is mounted on an arm 47 which turns about a shaft 48. The arm 47 includes a flange 49 which engages a cam 50. The cam 50 is mounted on the shaft 24 and includes a surface 51 which is an idle surface. The cam also includes a surface 52 which serves to lower the pawl 43 and includes an advancing portion 53, a dwell portion 54 and a lowering portion 55.

The construction is such that every time the shaft rotates it will first rotate the feed roller 41 to the correct angular position whereupon after the feed roller has remained held in this position by the pawl 43 the pawl will be lowered so that the operation can be repeated. This arrangement will prevent movement of the feed roll while a nut is being fed thereto.

In order to feed the nuts to be cracked in the proper sequence and in single file to the feed device I provide a chute comprising a series of adjacent, inclined channel forming members 60 which comprise horizontal strips 61 having their upper surfaces arranged to provide grooves 62. The members 60 are supported at their lower end on cross member 63 on the frame and adjacent their upper ends on cross member 64 with the cross member 64 higher than the cross member 63 so that the channel members slope downwardly toward the feed roll 41. Between each of the channel forming members I provide a slot 65 which serves to sift dirt and foreign matter and also provides space for agitators 66. These agitators comprise elongated members having enlarged heads 66' and which are mounted on bars 67 (see Fig. 10) which are in turn mounted on side members 68. Each of the side members is provided with a front lever 69 and a rear lever 70. These levers are pivoted to the side members 68 and are each provided with apertures 71 through which fastening members 72 extend. The fastening members also extend through bars 73 mounted on a lever 75 pivoted as at 76 on brackets 77 mounted on the frame.

The construction is such that by shifting the members 69 and 70 the angular disposition of the agitators 66 relative to the channel forming member 60 may be adjusted so that the lift and the tilt of the agitators may be altered. The levers 75 are connected by an end member 78 which is connected to one end of a spring 79, the other end of the spring being connected to the frame so that the spring end of the lever is normally pulled downwardly.

The ends of the levers 75 remote from the spring 79 engage cams 80 keyed to the shaft 24 and these cams are so timed that the agitators 66 are raised and lowered once for each rotation of the shaft 24 so that the nuts in the channel forming member 60 are thus agitated and caused to be fed properly to the feed roll 41.

The ends of the channel forming members 60 are provided with a closure 85 which is preferably made of metal and which includes forwardly bent portions 86 and rearwardly bent portions 87. This closure member 85 is mounted on the levers 75 by means of strips 81 so that each time the levers 75 are lowered by the cam 80 the closure moves away from the ends of the channels formed by the member 60 and then quickly moves back to position thus allowing one nut to be advanced to the feed roll 41.

In order to advance nuts properly to the channel forming chute member 60 I provide a second feed roll 90 which is mounted on a shaft 91 arranged on the frame. The feed roll 90 is provided with grooves 92 and spaced disk 92a similar to the grooves 42 and disk 42c previously described. This feed roll 90 is advanced by a member 93 which is mounted on a bar 94 which in turn is pivotally mounted as at 95 on a lever 96 pivotally mounted on a shaft 97 on the frame. A spring 98 normally urges the bar 93 against the feed roll 90 while a spring 96' urges the lever 96 downwardly. In order to shift the lever 96 I arrange the free end thereof remote from the pivot 95 so that it engages the cam 27 previously mentioned and is shifted by this cam when the shaft 24 rotates.

Mounted on the arm 96 I show another bar 100 which includes an offset upper portion 101 which is mounted on the lower portion of an agitator member 102 which is similar to the agitator 60 previously mentioned. The agitator 102 is provided with raised portions or distributors 103 mounted at the upper ends thereof. This agitator member 102 includes blades 104 which pass through slots 105 in a bin 106, which is provided with partition members 107 and which is disposed in inclined relation so that it feeds to the feed roll 90. The bottom of the bin 106 is provided with guide slats 108 and between certain of the slats I may provide a pair of trap doors 109 (Fig. 4) which are pivotally mounted on a shaft 110 on the bin 106 and the construction is such that should by chance or otherwise the operator place too many nuts in the bin 106 these trap doors will tilt to the dotted line position shown in Fig. 4 thus discharging a portion of the nuts from the bin 106.

If desired I may employ a sifter member 111 which is mounted on the frame as shown in Fig. 2 beneath the jaws 21 and 15 so that it may receive the cracked shells and nut meats and discharge the products of the cracking operation into a receptacle 112 while allowing the smaller pieces to pass to a receptacle 113.

In Fig. 22 I show a plurality of nut cracking machines 10 as mounted side by side for operation by a single motor 115 which through a belt 116 drives a shaft 24a on the first machine 10. This shaft 24a is connected by a shaft coupling 117 with the shaft 24a on the second machine and the second shaft is connected by a coupling 118 with a third shaft 24a and the number of machines may be arranged as desired.

In operation with the installation shown comprising three machines and allowing a speed of the motor so that it will drive the shaft 24a at the rate of forty revolutions per minute this will cause the shaft 24a to rotate once each second and a half. This time, it will be understood, may be altered. The timing of the three nut cracking machines 10 shown is such that they are out of phase to the extent of one-half second each so that during the first half second one of the machines will perform the cracking operation, the next half the second machine will operate and during the next half second the third machine will operate, the cams being so adjusted as to produce this result. With this arrangement there is no undue strain thrown on the drive shaft such as would be present if all of the nuts were cracked in all machines at one time. With the strain distributed and equalized a minimum of power is required and further the construction enables the use of lighter material with maximum wear secured.

In operating my apparatus the nuts are dropped into the bin 106 whence they find their way to the feed roll 90, thence to the primary feed roll 41 being agitated by the agitators and the passage to the feed roll 41 being controlled by the closure 85. The nuts are then advanced to a position between the movable jaw and the fixed jaw so that the movable jaw moves to cracking operation at the correct instant.

As previously described the various parts operate in timed relation to the movement of the shaft 24 so that a uniform proper feed and cracking operation is secured.

From the foregoing description it will be apparent that I have invented a novel nut cracking machine which can be economically manufactured and which is highly efficient for the intended purpose.

Having thus described my invention, I claim:

1. In a nut cracking machine, a frame, a fixed cracking jaw on said frame, a movable cracking jaw pivotally mounted on said frame, the cracking face of each of said jaws having grooves and said grooves having intersecting rows of protuberances on their opposed faces, means to urge said movable jaw towards the fixed jaw, said means including a cam member, said cam member including one portion to move the movable jaw to a cracking position, said cam member including another portion to shift the movable jaw slightly away from said fixed jaw, said cam member including another portion to move the movable jaw to cracking position and the cam member including another portion to finally cause said movable jaw to move to nut discharging position.

2. In a nut cracking apparatus, a frame, a pair of cracking jaws on said frame, means to move said jaws relative to each other, a feed roll having longitudinal grooves, means whereby said feed roll moves in timed relation with the movable jaw to feed nuts between the jaws, a chute, said chute having grooves in the bottom thereof, a shiftable agitator member extending through each of said grooves and disposed in the path of nuts therein and means to shift said agitator member.

3. In a nut cracking apparatus, a frame, a fixed cracking jaw on said frame, a movable cracking jaw on said frame, means to move said movable jaw towards and from the fixed jaw, said jaws having opposed grooves therein, a feed roll having longitudinal grooves, means to move said feed roll in timed relation with the movable jaw to feed nuts between the jaws, a chute having grooves therein to advance nuts to said feed roll, a closure member interposed between said chute and said feed roll, means to shift said closure member in timed relation with the movement of said movable jaw, said chute having slots in the bottom thereof, an agitator member disposed in each of said slots, means to shift said agitator member in timed relation to the movement of said cracking jaws.

4. In a nut cracking apparatus, a frame, a fixed cracking jaw on said frame, a movable cracking jaw on said frame, means to move said movable jaw towards and from the fixed jaw, said jaws having opposed grooves therein, a feed roll having longitudinal grooves, means to move said feed roll, a chute having grooves therein to hold nuts and adapted to advance nuts to said feed roll, a closure member interposed between said chute and said feed roll, means to shift said closure member, said chute having slots in the bottom thereof, an agitator member disposed in each of said slots, means to shift said agitator member, a second feed roll spaced from said first feed roll and adapted to discharge nuts to the chute, means to rotate said second feed roll, a feed bin including a second chute member disposed to discharge nuts to the second feed roll, said bin having slats leading to said second chute, said second chute having slots therein, agitator members in said second slots, and means to move said second slot agitator members.

5. In a nut cracking apparatus, a frame, a fixed cracking jaw on said frame, a movable cracking jaw on said frame, means to move said movable jaw towards and from the fixed jaw, said jaws having opposed grooves therein, a feed roll having longitudinal grooves, means whereby said feed roll moves in timed relation with the movable jaw to feed nuts between the jaws, a chute having grooves therein to hold nuts and adapted to advance nuts to said feed roll, a closure member interposed between said chute and said feed roll, means to shift said closure member in timed relation with the movement of said movable jaw, said chute having slots in the bottom thereof, an agitator member disposed in each of said slots, means to shift said agitator member in timed relation to the movement of said cracking jaws, a second feed roll spaced from said first feed roll and adapted to discharge nuts to the chute, means to rotate said second feed roll in timed relation to the movement of said movable jaw, a feed bin including a second chute member disposed to discharge nuts to the second feed roll, said bin having slats leading to said second chute, said second chute having slots therein, agitator members in said second slots, means to move said second slot agitator members in timed relation to the movement of the moving jaw.

6. In a nut cracking apparatus, a frame, a fixed cracking jaw on said frame, a movable cracking jaw on said frame, means to move said movable jaw towards and from the fixed jaw, said jaws having opposed grooves therein, a feed roll having longitudinal grooves, means whereby said feed roll moves in timed relation with the movable jaw to feed nuts between the jaws, a chute having grooves therein to hold nuts and adapted to advance nuts to said feed roll, a closure member interposed between said chute and said feed roll, means to shift said closure member in timed relation with the movement of said movable jaw, said chute having grooves in the bottom thereof, an agitator member disposed in each of said grooves, means to shift said agitator member in timed relation to the movement of said cracking jaws, a second feed roll spaced from said first feed roll and adapted to discharge nuts to the chute, means to rotate said second feed roll in timed relation to the movement of said movable jaw, a feed bin including a second chute member disposed to discharge nuts to the second feed roll, said bin having slats leading to said second chute, a trap door disposed adjacent said second chute, said trap door being pivotally mounted whereby an over supply of nuts will cause discharge thereof, said second chute having bottom slots therein, agitators in said second slots, means to move said second slot agitators in timed relation to the movement of the moving jaw and distributors on said last mentioned agitators and disposed in said second chute.

JOHN G. BERNEIKE.